(12) United States Patent
Holka et al.

(10) Patent No.: US 12,122,571 B2
(45) Date of Patent: Oct. 22, 2024

(54) FLEXIBLE MEMBRANE WITH VALVE

(71) Applicant: AR Packaging Systems AB, Lund (SE)

(72) Inventors: Simon Holka, Staffanstorp (SE); Max Hallin, Löddeköpinge (SE)

(73) Assignee: GPI Systems AB, Lund (SE)

(*) Notice: Subject to any disclaimer, the term of this patent is extended or adjusted under 35 U.S.C. 154(b) by 394 days.

(21) Appl. No.: 17/055,723

(22) PCT Filed: May 16, 2019

(86) PCT No.: PCT/SE2019/050444
§ 371 (c)(1),
(2) Date: Nov. 16, 2020

(87) PCT Pub. No.: WO2019/226097
PCT Pub. Date: Nov. 28, 2019

(65) Prior Publication Data
US 2021/0206544 A1 Jul. 8, 2021

(30) Foreign Application Priority Data
May 23, 2018 (SE) .................................. 1850610-5

(51) Int. Cl.
*B32B 3/24* (2006.01)
*B32B 3/08* (2006.01)
(Continued)

(52) U.S. Cl.
CPC ............ *B65D 51/1644* (2013.01); *B32B 3/08* (2013.01); *B32B 3/266* (2013.01); *B32B 7/12* (2013.01);
(Continued)

(58) Field of Classification Search
CPC ................................................ B65D 51/1644
See application file for complete search history.

(56) References Cited

U.S. PATENT DOCUMENTS 1,064,787 A 6/1913 Taylor
1,396,282 A 11/1921 Penn
(Continued)

FOREIGN PATENT DOCUMENTS

CH 280201 A 1/1952
CN 88102720 A 11/1988
(Continued)

OTHER PUBLICATIONS

International Preliminary Report on Patentability for PCT/SE2019/050444 mailed May 7, 2020; 6 pages.
(Continued)

*Primary Examiner* — William P Watkins, III
(74) *Attorney, Agent, or Firm* — Womble Bond Dickinson (US) LLP

(57) ABSTRACT

The present disclosure pertains to a laminate membrane for sealing an inner compartment in a packaging container comprising a top member and a bottom member. The top and bottom members are laminated sheet materials. The top member has a thickness, a top member first surface and a top member second surface facing the bottom member. The bottom member has a bottom member first surface facing the top member second surface and a bottom member second surface. The laminate membrane is provided with a valve for allowing gas in the inner compartment of the packaging container to exit therefrom. The valve has a valve outer edge and is arranged on the bottom member first surface. The valve is arranged within an opening in the top member such that an opening edge encircles the valve. A surface area of the opening is greater than a surface area of the valve.

16 Claims, 4 Drawing Sheets

(51) Int. Cl.

| | | |
|---|---|---|
| *B32B 3/26* | (2006.01) | |
| *B32B 7/12* | (2006.01) | |
| *B32B 15/08* | (2006.01) | |
| *B32B 15/12* | (2006.01) | |
| *B32B 27/10* | (2006.01) | |
| *B32B 29/00* | (2006.01) | |
| *B65D 43/16* | (2006.01) | |
| *B65D 51/16* | (2006.01) | |
| *B65D 51/18* | (2006.01) | |

(52) U.S. Cl.
CPC ............ *B32B 15/08* (2013.01); *B32B 15/12* (2013.01); *B32B 27/10* (2013.01); *B32B 29/002* (2013.01); *B65D 43/169* (2013.01); *B65D 51/18* (2013.01); *B32B 2307/582* (2013.01); *B32B 2307/7242* (2013.01); *B32B 2439/62* (2013.01); *B65D 2251/0021* (2013.01); *B65D 2251/0093* (2013.01)

(56) References Cited

U.S. PATENT DOCUMENTS

| | | |
|---|---|---|
| 1,515,277 A | 11/1924 | Root |
| 1,534,803 A | 4/1925 | Moore |
| 1,733,674 A | 10/1929 | Leiman |
| 2,073,636 A | 3/1937 | Holoubek |
| 2,076,407 A | 4/1937 | Mandell |
| 2,281,854 A | 5/1942 | Miller, Jr. |
| 2,314,338 A | 3/1943 | Graves |
| 2,317,651 A | 4/1943 | Talbot |
| 2,324,670 A | 7/1943 | Bergen |
| 2,348,377 A | 5/1944 | Goodyear |
| 2,371,173 A | 3/1945 | Hothersall |
| 2,409,655 A | 10/1946 | Annen |
| 2,568,697 A | 9/1951 | Amberg |
| 2,569,851 A | 10/1951 | Farrell |
| 2,608,341 A | 8/1952 | Eckman |
| 2,760,629 A | 8/1956 | Thagard, Jr. |
| 2,795,366 A | 6/1957 | Magill |
| 2,832,514 A | 4/1958 | O'Connor |
| 2,891,713 A | 6/1959 | O'Neil |
| 2,898,025 A | 8/1959 | Walker |
| 2,948,454 A | 8/1960 | Gillmore |
| 3,042,285 A | 7/1962 | Smith |
| 3,042,288 A | 7/1962 | Carpenter, Sr. |
| 3,049,277 A | 8/1962 | Shappell |
| 3,101,885 A | 8/1963 | Walsh |
| 3,109,576 A | 11/1963 | Karl |
| 3,195,763 A | 7/1965 | Fried et al. |
| 3,195,799 A | 7/1965 | Denenberg |
| 3,401,824 A | 9/1968 | Rouse |
| 3,402,876 A | 9/1968 | Kuchenbecker |
| 3,409,206 A | 11/1968 | Slouka et al. |
| 3,445,049 A | 5/1969 | Carpenter, Jr. |
| 3,506,183 A | 4/1970 | Turpin et al. |
| 3,655,111 A | 4/1972 | Surerus |
| 3,669,346 A | 6/1972 | Leezer et al. |
| 3,696,987 A | 10/1972 | Schuff |
| 3,940,496 A | 2/1976 | Turpin et al. |
| 4,078,686 A | 3/1978 | Karesh |
| 4,091,929 A | 5/1978 | Krane |
| 4,091,984 A | 5/1978 | McFarland |
| 4,198,901 A | 4/1980 | Knudsen |
| 4,207,725 A | 6/1980 | Smith |
| 4,210,618 A | 7/1980 | Piltz |
| 4,495,209 A | 1/1985 | Whiteside |
| 4,533,063 A | 8/1985 | Buchner et al. |
| 4,556,152 A | 12/1985 | Bogren |
| 4,606,462 A | 8/1986 | Bogren |
| 4,621,736 A | 11/1986 | Roccaforte |
| 4,632,298 A | 12/1986 | Schellengerg |
| 4,736,870 A | 4/1988 | Christensson |
| 4,804,101 A | 2/1989 | Heath |
| 4,850,503 A | 7/1989 | Larsson |
| 4,865,203 A | 9/1989 | Ueda |
| 4,883,193 A | 11/1989 | Christensson |
| 4,888,222 A | 12/1989 | Gibbons |
| 4,921,121 A | 5/1990 | Duvander et al. |
| 4,930,682 A | 6/1990 | Gordon et al. |
| 5,407,107 A | 4/1995 | Smith |
| 5,487,506 A | 1/1996 | Drummond et al. |
| 5,511,680 A | 4/1996 | Kinne |
| 5,514,394 A | 5/1996 | Lenahan |
| 5,566,529 A | 10/1996 | Sireix |
| 5,617,705 A | 4/1997 | Sanfilippo et al. |
| 5,641,118 A | 6/1997 | Benham |
| 5,685,480 A | 11/1997 | Choi |
| 5,752,646 A | 5/1998 | Sandstrom |
| 5,803,294 A | 9/1998 | Bello et al. |
| 5,820,016 A | 10/1998 | Stropkay |
| 5,897,019 A | 4/1999 | Stropkay |
| 5,950,917 A | 9/1999 | Smith |
| 6,047,878 A | 4/2000 | Lowry |
| 6,092,717 A | 7/2000 | Lowry |
| 6,165,114 A | 12/2000 | Stahlecker et al. |
| 6,251,203 B1 | 6/2001 | Vala et al. |
| 6,325,232 B1 | 12/2001 | Luttmann |
| 6,415,940 B1 | 7/2002 | Brabson, II |
| 6,450,351 B1 | 9/2002 | Thompson |
| 6,644,541 B2 | 11/2003 | Stewart |
| 6,761,279 B1 | 7/2004 | Martin et al. |
| 7,169,418 B2 | 1/2007 | Dalton |
| 7,201,714 B2 | 4/2007 | Zoeckler et al. |
| 7,370,788 B1 | 5/2008 | Otani et al. |
| 7,703,625 B2 | 4/2010 | Westphal |
| 7,757,879 B2 | 7/2010 | Schuetz |
| 7,798,319 B1 | 9/2010 | Bried |
| 8,025,171 B2 | 9/2011 | Cassol |
| 8,220,701 B2 | 7/2012 | Fontaine et al. |
| 8,317,671 B1 | 11/2012 | Zoeckler |
| 8,403,819 B2 | 3/2013 | Zoeckler |
| 8,403,820 B2 | 3/2013 | Zoeckler |
| 8,684,224 B2 | 4/2014 | House |
| 8,915,395 B2 | 12/2014 | Gersovitz |
| 9,387,963 B2 | 7/2016 | McBroom |
| 9,718,574 B2 | 8/2017 | Sireix |
| 9,815,579 B2 | 11/2017 | Larsson et al. |
| 9,821,527 B2 | 11/2017 | Hagelqvist |
| 9,975,305 B2 | 5/2018 | Strand et al. |
| 10,370,158 B2 | 8/2019 | Herlin et al. |
| 10,730,660 B2 | 8/2020 | Herlin et al. |
| 10,736,468 B2 | 8/2020 | Herlin et al. |
| 10,787,280 B2 | 9/2020 | Herlin et al. |
| 11,111,062 B2 | 9/2021 | Herlin et al. |
| 11,192,688 B2 | 12/2021 | Herlin et al. |
| 2002/0107127 A1 | 8/2002 | Buisson |
| 2002/0130126 A1 | 9/2002 | Rosenberg |
| 2003/0111522 A1 | 6/2003 | Deering et al. |
| 2003/0183540 A1 | 10/2003 | Onishi |
| 2004/0050437 A1 | 3/2004 | Engel et al. |
| 2004/0142133 A1 | 7/2004 | De Coninck |
| 2004/0206052 A1 | 10/2004 | Shean |
| 2004/0238553 A1 | 12/2004 | Lane et al. |
| 2005/0051461 A1 | 3/2005 | Bryant |
| 2005/0173501 A1 | 8/2005 | Jones |
| 2005/0189406 A1 | 9/2005 | Welchel et al. |
| 2005/0190995 A1 | 9/2005 | Koyanagi |
| 2005/0223680 A1 | 10/2005 | Sireix |
| 2005/0252952 A1 | 11/2005 | Nomula |
| 2006/0057315 A1 | 3/2006 | De Coninck et al. |
| 2006/0124719 A1 | 6/2006 | Mannlein |
| 2006/0254942 A1 | 11/2006 | Cargile, Jr. |
| 2006/0257534 A1 | 11/2006 | Maddock |
| 2006/0289542 A1 | 12/2006 | Schedl |
| 2007/0090105 A1 | 4/2007 | Elgebrant |
| 2007/0145001 A1 | 6/2007 | Tilto |
| 2007/0157577 A1 | 7/2007 | Buisson |
| 2007/0170236 A1 | 7/2007 | Rasanen |
| 2007/0234667 A1 | 10/2007 | Lubker et al. |
| 2007/0235512 A1 | 10/2007 | Drummond |
| 2008/0041861 A1 | 2/2008 | Crawford et al. |
| 2008/0110896 A1 | 5/2008 | Westphal |
| 2008/0156805 A1 | 7/2008 | Perry et al. |

(56) References Cited

U.S. PATENT DOCUMENTS

| | | |
|---|---|---|
| 2008/0156808 A1 | 7/2008 | Perry et al. |
| 2009/0039078 A1 | 2/2009 | Sanfilippo et al. |
| 2009/0177179 A1 | 7/2009 | Engelbrecht |
| 2009/0236346 A1 | 9/2009 | Hofeldt et al. |
| 2009/0314775 A1 | 12/2009 | Dietrich et al. |
| 2010/0018883 A1 | 1/2010 | Patel |
| 2010/0065557 A1 | 3/2010 | Gersovitz |
| 2010/0108670 A1 | 5/2010 | Perry et al. |
| 2010/0133127 A1 | 6/2010 | Jenner |
| 2010/0140129 A1 | 6/2010 | Sanfilippo |
| 2010/0142862 A1 | 6/2010 | Sam |
| 2010/0180553 A1 | 7/2010 | Tilton |
| 2010/0270301 A1 | 10/2010 | Cronin |
| 2010/0308044 A1 | 12/2010 | Perry et al. |
| 2010/0308065 A1 | 12/2010 | Vandamme et al. |
| 2010/0308066 A1 | 12/2010 | Perry et al. |
| 2011/0006066 A1 | 1/2011 | Vandamme et al. |
| 2011/0240666 A1 | 10/2011 | Mihaylov |
| 2011/0253725 A1 | 10/2011 | Killian |
| 2012/0103353 A1 | 5/2012 | Sebastian et al. |
| 2012/0125932 A1 | 5/2012 | Sierra-Gomez |
| 2012/0298733 A1 | 11/2012 | Xu et al. |
| 2013/0029823 A1 | 1/2013 | Zoeckler |
| 2013/0048125 A1 | 2/2013 | Hoffman et al. |
| 2013/0092312 A1 | 4/2013 | Cassoni |
| 2013/0186901 A1 | 7/2013 | Lejon et al. |
| 2014/0109522 A1 | 4/2014 | Sanfilippo |
| 2014/0215973 A1 | 8/2014 | Hagelqvist |
| 2014/0262903 A1 | 9/2014 | Mitten |
| 2014/0287901 A1 | 9/2014 | Hagelqvist |
| 2015/0038309 A1 | 2/2015 | Hoffman et al. |
| 2015/0041470 A1 | 2/2015 | Huffer et al. |
| 2015/0099616 A1 | 4/2015 | Chapman et al. |
| 2015/0148208 A1 | 5/2015 | Sireix |
| 2016/0000270 A1 | 1/2016 | Wiggins et al. |
| 2016/0137377 A1 | 5/2016 | Tracy |
| 2017/0073142 A1 | 3/2017 | Loomis et al. |
| 2017/0247159 A1* | 8/2017 | Hansen .................... B32B 3/18 |
| 2017/0283136 A1 | 10/2017 | Branyon |
| 2017/0297769 A1 | 10/2017 | Gersovitz |
| 2018/0016038 A1 | 1/2018 | Herlin et al. |
| 2018/0022505 A1 | 1/2018 | Herlin et al. |
| 2018/0194527 A1 | 7/2018 | Sasaki et al. |
| 2018/0229907 A1 | 8/2018 | Gayer |
| 2018/0237206 A1 | 8/2018 | Jobe |
| 2018/0311940 A1 | 11/2018 | Toft et al. |
| 2019/0127100 A1 | 5/2019 | Herlin et al. |
| 2019/0127107 A1 | 5/2019 | Herlin et al. |
| 2019/0135508 A1 | 5/2019 | Sunning et al. |
| 2019/0256230 A1 | 8/2019 | Holka |
| 2021/0070520 A1 | 3/2021 | Huffer |
| 2021/0206544 A1 | 7/2021 | Holka et al. |
| 2022/0135260 A1 | 5/2022 | Larsson |
| 2022/0363427 A1 | 11/2022 | Andersson |
| 2023/0054953 A1 | 2/2023 | Graham |

FOREIGN PATENT DOCUMENTS

| | | |
|---|---|---|
| CN | 1189804 A | 8/1998 |
| CN | 1914096 A | 2/2007 |
| CN | 2915695 Y | 6/2007 |
| CN | 101391493 A | 3/2009 |
| CN | 201338810 | 11/2009 |
| CN | 101754912 | 6/2010 |
| CN | 102190118 A | 9/2011 |
| CN | 101670909 B | 1/2012 |
| CN | 102991764 A | 3/2013 |
| CN | 103895952 A | 7/2014 |
| CN | 103979180 A | 8/2014 |
| CN | 104812680 A | 7/2015 |
| CN | 107108068 A | 8/2017 |
| CN | 206954829 U | 2/2018 |
| CN | 109153475 A | 1/2019 |
| CN | 208559788 U | 3/2019 |
| DE | 884862 C | 7/1953 |
| DE | 3411371 A1 | 10/1985 |
| DE | 10 2005 026903 A1 | 8/2006 |
| DE | 10 2011 014 844 A1 | 9/2012 |
| DE | 10 2014 000 543 A1 | 7/2015 |
| EP | 0 013 132 A1 | 7/1980 |
| EP | 0 062 929 A2 | 10/1982 |
| EP | 0 094 359 A2 | 11/1983 |
| EP | 0 104 548 B1 | 6/1987 |
| EP | 0 312 513 A2 | 4/1989 |
| EP | 0 370 982 A1 | 5/1990 |
| EP | 0 611 703 A2 | 8/1994 |
| EP | 0 820 936 A2 | 1/1998 |
| EP | 1 052 181 A1 | 11/2000 |
| EP | 1818259 A2 | 8/2007 |
| EP | 1 842 792 A1 | 10/2007 |
| EP | 1 842 792 B1 | 10/2008 |
| EP | 1 035 025 B1 | 3/2011 |
| EP | 2 716 551 A1 | 4/2014 |
| EP | 2719637 A1 | 4/2014 |
| EP | 2 731 874 A1 | 5/2014 |
| EP | 2 927 132 A1 | 10/2015 |
| EP | 3 085 636 A1 | 10/2016 |
| EP | 3095600 A1 | 11/2016 |
| EP | 3162553 A1 | 5/2017 |
| EP | 3 409 470 A1 | 2/2018 |
| EP | 3 342 720 A1 | 7/2018 |
| EP | 3 442 875 | 2/2019 |
| EP | 3 481 727 | 5/2019 |
| EP | 3 546 387 | 10/2019 |
| EP | 3 578 477 | 12/2019 |
| FR | 1358396 A | 4/1964 |
| FR | 828311 A | 5/1983 |
| FR | 2716408 A1 | 8/1995 |
| FR | 2 981 333 | 4/2013 |
| FR | 2986514 A1 | 8/2013 |
| FR | 3043069 | 5/2017 |
| GB | 190722536 A | 10/1908 |
| GB | 1911 00947 A | 12/1911 |
| GB | 819960 A | 9/1959 |
| GB | 920354 A | 3/1963 |
| GB | 998102 A | 7/1965 |
| GB | 1038995 A | 8/1966 |
| GB | 2 281 895 A | 3/1995 |
| GB | 2526548 A | 12/2015 |
| JP | S58-216539 A | 12/1983 |
| JP | S59-62435 A | 4/1984 |
| JP | S60501305 A | 8/1985 |
| JP | S61217350 A | 9/1986 |
| JP | S6375 A | 1/1988 |
| JP | H0285118 A | 3/1990 |
| JP | H05-58640 U | 8/1993 |
| JP | H09-99939 A | 4/1997 |
| JP | H09-290822 A | 11/1997 |
| JP | 3025434 B2 | 3/2000 |
| JP | 2000-203612 A | 7/2000 |
| JP | 2001-030383 | 2/2001 |
| JP | 2003-231191 | 8/2003 |
| JP | 2004-001884 A | 1/2004 |
| JP | 2004-018100 A | 1/2004 |
| JP | 2004-026197 A | 1/2004 |
| JP | 2004-155478 A | 6/2004 |
| JP | 2004-315094 A | 11/2004 |
| JP | 2004-535993 | 12/2004 |
| JP | 2005-041515 | 2/2005 |
| JP | 2005-219319 | 8/2005 |
| JP | 2005-333802 | 12/2005 |
| JP | 3843510 B2 | 11/2006 |
| JP | 2007-145415 A | 6/2007 |
| JP | 2010-284866 A | 12/2010 |
| JP | 2015-174690 | 10/2015 |
| JP | 2016-084169 A | 5/2016 |
| JP | 2016-088524 A | 5/2016 |
| JP | 2016-179849 A | 10/2016 |
| JP | 2017-074951 A | 4/2017 |
| JP | 2019-137067 | 8/2019 |
| JP | 6596835 B2 | 10/2019 |
| JP | 2020-039532 A | 3/2020 |
| KR | 10-2007-0113467 | 11/2005 |
| RU | 2 188 783 C2 | 9/2002 |

(56) References Cited

FOREIGN PATENT DOCUMENTS

| | | |
|---|---|---|
| SE | 453821 B | 3/1988 |
| SE | 1651162 A1 | 3/2018 |
| SU | 1433404 A3 | 10/1988 |
| WO | WO 84/04511 A1 | 11/1984 |
| WO | WO 87/03536 A1 | 6/1987 |
| WO | WO 91/14623 A1 | 10/1991 |
| WO | WO 03/039201 | 5/2003 |
| WO | WO 2004/060767 A1 | 7/2004 |
| WO | WO 2005/032959 A1 | 4/2005 |
| WO | WO 2005/075314 A2 | 8/2005 |
| WO | WO 2006/068585 A1 | 6/2006 |
| WO | WO 2009/130043 | 10/2009 |
| WO | WO 2020/211939 A1 | 10/2010 |
| WO | WO 2011/052507 A1 | 5/2011 |
| WO | WO 2013/009227 A1 | 1/2013 |
| WO | WO 2013/057392 A1 | 4/2013 |
| WO | WO 2013/109174 A1 | 7/2013 |
| WO | WO 2014/011938 A2 | 1/2014 |
| WO | WO 2014/062119 A1 | 4/2014 |
| WO | WO 2015/145600 | 10/2015 |
| WO | WO 2015/145601 | 10/2015 |
| WO | WO 2015/187004 A1 | 12/2015 |
| WO | 2016030071 A1 | 3/2016 |
| WO | WO 2016/034462 A1 | 3/2016 |
| WO | WO 2016/126191 A1 | 8/2016 |
| WO | WO 2016/126193 A1 | 8/2016 |
| WO | WO 2017/180056 A1 | 10/2017 |
| WO | WO 2018/009128 A1 | 1/2018 |
| WO | WO 2018/009130 A1 | 1/2018 |
| WO | WO 2018/009134 A1 | 1/2018 |
| WO | WO 2018/009136 A1 | 1/2018 |
| WO | WO 2018/009138 A1 | 1/2018 |
| WO | WO 2018/217156 A1 | 11/2018 |
| WO | WO 2019/068384 A1 | 4/2019 |
| WO | WO 2019/226097 A1 | 11/2019 |
| WO | WO 2020/261170 A1 | 12/2020 |

OTHER PUBLICATIONS

First Notice issued by the Swedish Patent Office for Application No. 1850610-5 mailed Dec. 13, 2018; 13 pages.
Machine Translation of JP S58-216539 A to Tomoo (Year: 1983).
Machine Translation of WO 2019/068384 A1 (2019).

\* cited by examiner

FLEXIBLE MEMBRANE WITH VALVE

CROSS-REFERENCE TO RELATED APPLICATIONS

The present application is a national phase entry under 35 U.S.C. § 371 of International Application No. PCT/SE2019/050444, filed May 16, 2019, which claims priority from Swedish Patent Application No. 1850610-5, filed May 23, 2018, the disclosures of which are hereby incorporated by reference in their entirety.

TECHNICAL FIELD

The disclosure pertains to a laminate membrane for sealing an inner compartment in a packaging container. The laminate membrane is a two-layer structure comprising a top member and a bottom member. The membrane is provided with a valve to allow gas to exit the closed packaging container. Disclosed herein is also a packaging container comprising the laminate membrane.

BACKGROUND OF THE INVENTION

Consumer goods, in particular bulk solids, are often packaged in relatively rigid paperboard packaging containers which protect the bulk solids during transport and storage at the manufacturer and retailer end and during storage and dispensing at the consumer end. One of the important factors in the area of bulk packaging containers is to ascertain that the quality of the packaged goods remains at a high level from the initial opening of the container until the packaged product has been completely consumed. The containers are usually provided with an openable and closable lid, and are additionally provided with an inner transport closure which keeps the contents fresh and protected against contamination up until a first opening of the packaging container by a consumer. One type of transport closure is a laminate membrane comprising a top member and a bottom member. The laminate membrane is often welded to the inner wall of the packaging container to provide a tightly sealed packaging container. However during transport of the packaging containers at higher altitudes and/or for packages comprising coffee which produces gas to some extent a pressure above the ambient pressure may be obtained within said packaging container. The higher internal pressure leads to bulging transport seals and frequent peeling along the seal between the transport seal and the inner wall of the packaging container. To avoid this problem the packaging containers, and more specifically the transport closure, may for example be provided with a valve allowing gas to exit the inner compartment of the packaging container. However, providing a space consuming valve on top of a transport closure may cause problems with stackability and storage of the transport closure prior to assembly of the packaging container.

An object of the present disclosure is to provide an improved laminate membrane having a more reliable sealing and a better stackability of a plurality of laminate membranes, as well as a packaging container being provided with the sealing laminate membrane.

SUMMARY OF THE INVENTION

One or more of the above objects may be achieved with a laminate membrane for a packaging container for bulk solids in accordance with claim 1, a stack of laminate membranes in accordance with claim 11 or a packaging container for bulk solids in accordance with claim 13. Further embodiments are set out in the dependent claims, in the following description and in the drawings.

The laminate membrane for sealing an inner compartment in a packaging container as disclosed herein comprises a top member and a bottom member. The top and bottom members are laminated sheet materials. The top member has a thickness, a top member first surface and a top member second surface facing the bottom member. The bottom member has a bottom member first surface and a bottom member second surface facing the top member second surface. The laminate membrane is provided with a valve for allowing gas in the inner compartment of the packaging container to exit therefrom. The valve has a valve outer edge and is arranged on the bottom member first surface. The top member is provided with an opening having an opening edge. The valve is arranged within said opening such that the opening edge encircles the valve. A surface area of the opening is greater than a surface area of the valve. The valve has a thickness and the thickness of the top member is equal to or greater than the thickness of the valve.

Packaging containers for bulk solids sensitive to air and/or moisture may be provided with a transport closure in the form of a laminate membrane sealed to the packaging container with a circumferential edge seal in order to better preserve the content therein. However, during transport, such as at higher altitudes, and storage, for packaging containers comprising contents emitting gas, such packaging containers may experience a rising pressure relative to the ambient pressure which may cause the laminate membrane edge seal to start peeling off. The relative increasing pressure within the packaging container may cause the laminate membrane to bulge outwardly and create a pulling force on the seal on the edge seal between the laminate membrane and the packaging container and possible break in the seal. To avoid this problem the laminate membrane may be provided with a valve allowing excess gas in the inner compartment of the packaging container to exit therefrom. It has however been discover that providing membranes with valves may cause problems with stacking of the membranes prior to inserting them into the packaging container, i.e. during assembly of the packaging container. The valves are conventionally provided on top of the membranes, increasing the height of the membrane and rendering the main surface of the membrane irregular. This increases the height of the stack and consequently the space consumed by the stack. The increased height of the stack also reduces the numbers of membranes which may be inserted at a time into machines during assembly of the packaging container increasing the manual work needed. The irregular surface caused by the fact that a valve is arranged on top of the membrane may also cause instability of the stack.

The thickness of the valve, as disclosed herein, should be measured without applying load to the valve. The thickness of the valve is the greatest thickness of the valve, as seen from the bottom member first surface when arranged on the laminate membrane.

The fact that the membrane is a laminate membrane and the valve is provided within an opening in the top member and that the thickness of the valve is equal to or smaller than the thickness of the top member solves the above defined problems. The main top surface of the laminate membrane will be essentially smooth and regular improving the stackability and storage of the laminate membranes.

During manufacturing of the laminate membrane, the valve is arranged in the opening of the top member at relatively high speed and the fact that the opening has a surface area that is greater than the valve simplifies the application of the valve and ensures improved stackability since the risk of the valve being arranged slightly off set the opening and thus on the top member is reduced. The opening edge of the opening is thus arranged outwardly the outer edge of the valve.

The fact that the opening is greater than the valve and that the valve is a separate component from the laminate membrane increases the choice of material for both the top member and the valve. The top member and the valve may thus comprise different material(s). The criteria for a material used for the valve, such as flexibility and oil resistance, does not need to be fulfilled by the top member material(s), and important criteria's for the top member, such as for example providing a barrier function and being a tearable membrane, do not need to be fulfilled by the valve material. Such requirements limit the choice of material greatly and may also necessitate the use of more than one material layer for the valve, which gives a more costly and environmentally unfavourable solution.

The valve may comprise an upper barrier layer made of a flexible material, such as a polymeric film layer. The polymeric film layer may be a polyethylene film. The upper barrier layer may be transparent. The transparency may facilitate quality inspection, such as vision control, of the valve and the portion of the bottom member under the valve, for example, inspection of perforations provided in the bottom member allowing gas in the inner compartment of the packaging container to exit therefrom.

Optionally, the top member has a greater thickness than the valve, such that the first surface of the top member is slightly above the upper surface of the valve, as seen in a thickness direction.

The laminate membrane as disclosed herein may preferably be gastight. A laminate membrane may comprise a structural layer such as a metallic foil layer, for example aluminium foil layer, a paper layer or a paperboard layer and a polymeric protective and/or bonding layer. A gastight tear membrane is advantageous when the bulk solids stored in the packaging container are sensitive to air and/or moisture and it is desirable to avoid contact of the packaged bulk solids with ambient air.

The laminate membrane as disclosed herein may have any shape adapted to a corresponding cross-section of a packaging container body, including circular, oval, rectangular and modified rectangular shapes.

It may be preferred that the laminate membrane as disclosed herein has a modified rectangular shape with four side edges joined by four curved corner portions. Modified rectangular shapes include modified square shapes, i.e. rectangular shapes having side edges of equal length.

The side edges of a laminate membrane having rectangular or modified rectangular shape may consist of first and second longitudinal side edges and first and second transverse side edges, the longitudinal side edges having a length greater than a length of the transverse side edges. The side edges may be straight side edges or may have a slight curvature, with a radius of curvature in the range of from 200-700 mm, preferably 300-600 mm, more preferably 400-500 mm.

The side edges are connected by curved corner portions, wherein the radius of curvature of the corner portions may be in the range of 5-60 mm, preferably 10-40 mm, more preferably 15-30 mm.

Optionally, the opening in the top member may be a centred opening, as seen from above.

The opening in the top member may have a surface area of at least 1 $cm^2$, such as from 1 $cm^2$ to 6 $cm^2$. The surface area of the opening in the top member is greater than the surface area of the valve. Optionally, the surface area is up to 70% greater than the surface area of the valve or up to 50% greater than the surface area of the valve. Optionally, the surface area of the opening is up to 20-30% greater than the surface area of the valve. Optionally, the surface area of the opening is from 5% to 30% greater than the surface area of the valve. This has been seen to provide an improved stackability of the laminate membranes.

The opening edge may be provided at a distance of 0.5 mm or more from the valve outer edge, i.e. the opening edge is provided 0.5 mm outwardly from the valve outer edge at every given point along the opening edge. Optionally the opening edge may be provided at a distance of 1 mm or more from the valve outer edge, such as 2 mm, 3 mm or 4 mm or more from the valve outer edge. The opening edge may be provided at from 3 mm to 12 mm from the valve outer edge, such that from 3 mm to 8 mm, or from 3 to 7 mm from the valve outer edge. The fact that the opening edge is provided at a distance of 2 mm or more, or 3 mm or more, from the valve outer edge minimizes the risk for defective laminate membranes wherein the valve has been applied slightly offset the opening and enables a higher manufacturing speed when applying valves to the laminate membranes according to the present disclosure as less precision is required.

Bonding of the top member to the bottom member is preferably made by heat sealing, although adhesive attachments may be used as an alternative or as a complement. The top member and the bottom member are preferably laminates comprising a polymer protective and/or bondable layer and a structural layer, such as a layer of aluminium foil, paper, etc.

The attachments between the top member and the bottom member are permanent attachments, implying that the material in the layers will break before an attachment is broken when pulling at the tear strip.

The sealing membrane may be a fully or partly removable laminate membrane, such as for example a tear membrane provided with a tearable inner sealing member and the structural layer of the top laminate member sheet material may be a metallic foil or a paper layer and a thermoplastic welding layer. The sealing membrane may for example also be a partly removable laminate membrane such as a push-and-pull laminate membrane which is opened with a push-tab and/or a pull-tab.

The bottom member may comprise a laminate sheet material comprising a metallic foil or a paper layer and a thermoplastic welding layer, the bottom laminate sheet material being joined to the top member by welding in one or more discrete welding areas.

The top member may have a thickness of less than 600 μm, such as less than 500 μm, such as less than 300 μm, such as less than 200 μm, such as less than 150 μm. The top member may have an essential uniform thickness. The top member may comprise a metallic foil layer, such as aluminium foil layer, a paper layer or a paperboard layer and a polymeric welding layer and/or a polymeric protective layer. The top member may comprise a metallic foil layer having a thickness of from 5 to 40 μm.

The bottom member may comprise a metallic foil layer, such as aluminium foil layer, and a polymeric welding layer and/or a polymeric protective layer. The bottom member may comprise a metallic foil layer having a thickness of from 5 to 40 μm.

The valve may have a thickness of less than 500 μm, such as less than 400 μm, such as less than 300 μm, such as less than 150 μm, such as less than 130 μm, for example from 90 to 125 μm. The valve may be at least 5% thinner than the top member, such as from 5 to 50% thinner than the top member, optionally from 10% to 25% thinner. The valve may be a one-way pressure relief valve. Examples of suitable valves are for example disclosed in EP 2 719 637 A1 or US 2015/0038309 A1.

The bottom member may be perforated in an area covered by the valve.

The top member may have a top member peripheral edge and the bottom member may have a bottom member peripheral edge. Optionally, the top layer peripheral edge extends beyond the bottom layer peripheral edge around the perimeter of the membrane forming a membrane welding collar.

A plurality of the laminate membranes according to the present disclosure may be arranged in a stack.

The stack of laminate membranes comprising a plurality of laminate membranes according to the present disclosure has a height and preferably the height of the stack of laminate membranes is not increased by the provision of a valve to each of the laminate membranes as disclosed herein.

As the total thickness of the laminate membrane according the present disclosure not is increased, the stack comprising a plurality of laminate membranes remains stable and the height of the stack is not more than 10% greater than the combined thickness of the top and bottom member times the number of membranes in the stack.

Disclosed herein is also a packaging container comprising the laminate membrane as disclosed herein as an inner sealing member. The packaging container comprises a tubular container body with a top end with a top opening and a bottom end with a bottom opening comprising a container bottom. The container body has an inner surface facing towards a closed inner compartment in the packaging container and an outer surface facing away from the inner compartment. The packaging container is closed at the top opening by the laminate membrane.

The laminate membrane top member may have a top member peripheral edge and the bottom member may have a bottom member peripheral edge. Optionally, the top layer peripheral edge extends beyond the bottom layer peripheral edge around the perimeter of the membrane forming a membrane welding collar and the laminate membrane is welded to the inner surface of the container body.

The packaging container is preferably a paperboard packaging container, as defined herein. One example of a further suitable packaging container for use in combination with the sealing membrane is a packaging container in accordance with WO 2017/180056 A1.

As used herein, a paperboard packaging container is a packaging container wherein the container body is formed from paperboard sheet material. The paperboard container may be formed in any manner known in the art, e.g. by forming a container body by bending a paperboard sheet material into a tubular shape and longitudinally closing the tube by joining overlapping or abutting side edges of the paperboard material. The join between the side edges may be covered by a sealing strip. In the paperboard packaging containers as disclosed herein, the container bottom is formed from a separate bottom disc which is attached at the bottom end of the container body tube. The bottom disc may be attached on the inside of the container body tube and may be inset from the container body bottom edge to accommodate a bottom reinforcing rim attached to the inner surface of the container body and/or to create a receiving space for stacking of the containers As used herein, a paperboard material is a sheet material predominantly made from cellulose fibres or paper fibres. The sheet material may be provided in the form of a continuous web or may be provided as individual sheets of material. The paperboard material may be a single ply or multi ply material and may be a laminate comprising one or more layers of materials such as polymeric films and coatings, metal foil, etc. The polymeric films and coatings may include or consist of thermoplastic polymers. The paperboard material may be coated, printed, embossed, etc. and may comprise fillers, pigments, binders and other additives as known in the art. The paperboard materials as disclosed herein may also be referred to as cardboard or carton materials.

As used herein, the term "bulk solids" refers to a solid bulk material from which a desired amount of the product may be poured, scooped or taken by hand out of a packaging container. The bulk material may be dry or moist. The bulk solids which are suitable for packing in the paperboard packaging containers as disclosed herein include any material in the form of particles, granules, grinds, plant fragments, short fibres, flakes, seeds, pieces, etc.

The paperboard packaging container as disclosed herein may be a container for alimentary products such as infant formula, coffee, tea, rice, flour, sugar, cereals, soup powder, custard powder, snacks, or the like. Alternatively, the bulk solids may be non-alimentary, such as tobacco, detergent, fertilizer, chemicals or the like. The present disclosure mainly relates to bulk solids emitting gases, such as for example coffee, instant formula and also roasted nuts, for example coffee oxidizes during storage and emits carbon dioxide increasing the pressure inside the container.

The laminate membrane as disclosed herein should be gastight. A gastight tear membrane may comprise a structural layer such as a metallic foil layer, for example aluminium foil layer, or a paper layer and a polymeric protective and/or bonding layer. A gastight tear membrane is advantageous when the bulk solids stored in the packaging container are sensitive to air and/or moisture and it is desirable to avoid contact of the packaged bulk solids with ambient air. The laminate membrane may of the kind disclosed in WO 2014/062119 A1.

The barrier properties of the packaging containers disclosed herein may be designed to meet different requirements of tightness depending on the goods which is packaged in the packaging container. By way of example, in a packaging container for dried powder, such as sugar or flour, a lower barrier level may be sufficient than in a packaging container for e.g. infant formula which is highly sensitive to oxygen and moisture exposure.

A gastight packaging container is particularly advantageous when the material stored in the packaging container is sensitive to air and/or moisture. It may also be desirable to keep fragrances and aromas in the packaging container and prevent the packaged contents from taking up scents and flavours from the ambient air. In case the packaging container has been filled in a protective gas atmosphere, the gas-tight tear membrane keeps the protective gas trapped together with the packaged contents in the sealed inner compartment.

BRIEF DESCRIPTION OF THE DRAWINGS

The present invention will be further explained hereinafter by means of non-limiting examples and with reference to the appended drawings wherein.

DETAILED DESCRIPTION

It is to be understood that the drawings are schematic and that individual components are not necessarily drawn to scale. The packaging container, the laminate membrane and the valve shown in the figures are provided as examples only and should not be considered limiting to the invention as disclosed herein. In particular, it should be understood that the laminate membrane as disclosed herein may be applied to any packaging container where a breakable transport seal is desired in addition to the provision of a reclosable lid. Furthermore, the size and shape of the packaging container, a corresponding laminate membrane and valve may be different from what is shown in the figures. The valve may have a different size, configuration and shape.

Figure 1:
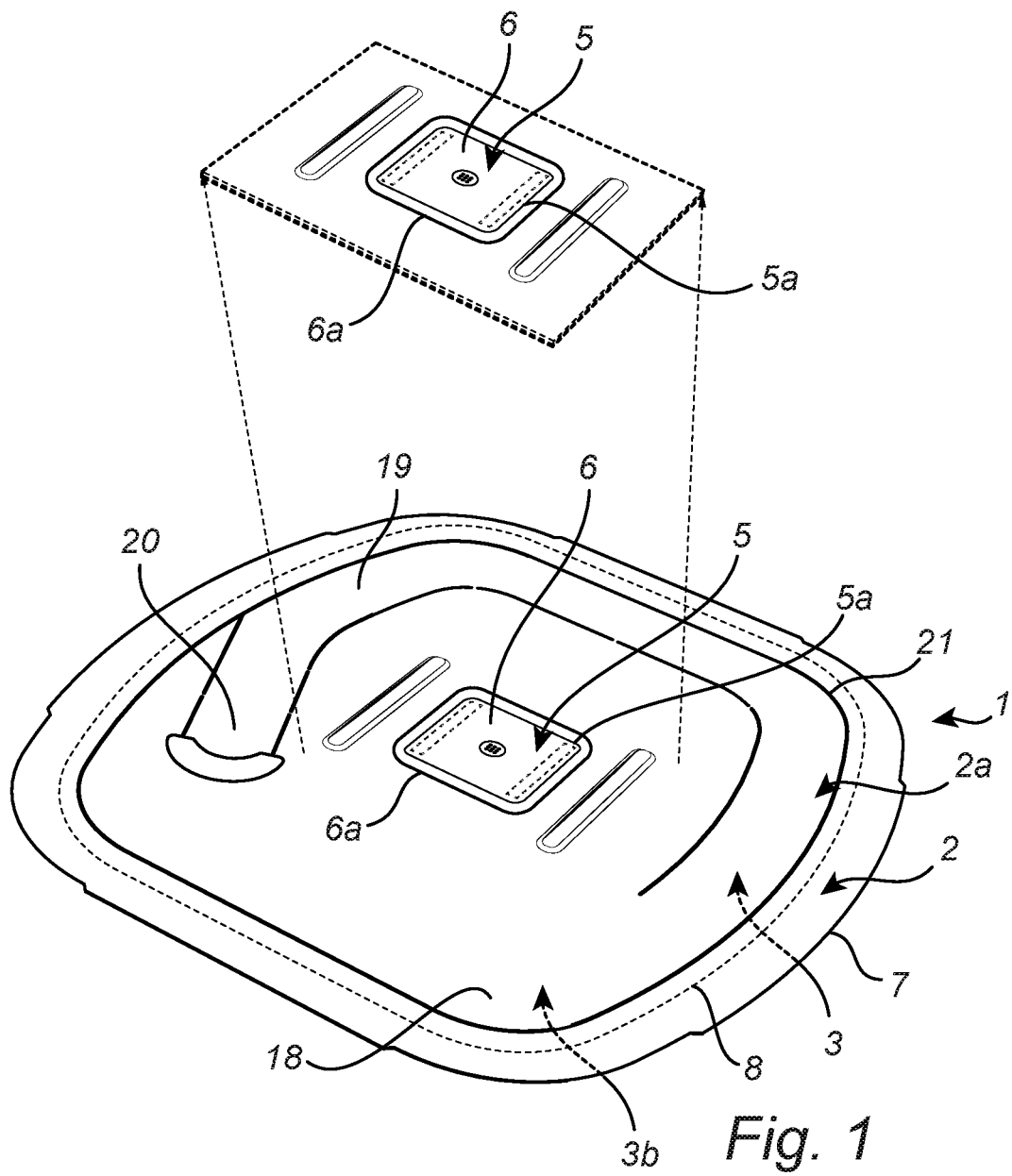
FIG. 1 shows a perspective view of a laminate membrane according to the present disclosure.

With reference to FIG. 1 there is shown a laminate membrane 1, in the form of a tear membrane 1. The laminate membrane is for sealing an inner compartment in a packaging container (not shown). The laminate membrane 1 has a top member 2 and a bottom member 3, each being laminate sheet materials. The top member 2 has a top member peripheral edge 7 and the bottom member 3 has a bottom member peripheral edge 8. The top member 2 comprises a top member first surface 2a and the bottom member comprises a bottom member second surface 3b. In FIG. 1, the top member 2 is shown to be larger than the bottom member 3 with the top member peripheral edge 7 arranged laterally outboard of the bottom member peripheral edge 8. Alternatively, the top member 2 and the bottom member 3 may have the same size and shape, or the bottom member 3 as shown may be larger than the top member 2 with the bottom member peripheral edge 8 arranged laterally outboard of the top member peripheral edge 7. The edge portion of the top member 2 which extends outward of the peripheral edge 8 of the bottom member 3 provides the laminate membrane 1 with a thinner more flexible sealing border, serving as a membrane welding collar 9 for sealing the laminate membrane 1 to a container wall. The top member 2 has a centrally arranged opening 6 therein. The opening 6 provided in the top member 2 may be cut out from the top member 2 and has an opening edge 6a. As illustrated, the laminate membrane 1 is provided with a valve 5 for, when the laminate membrane is being arranged in a packaging container, allowing gas in the inner compartment of the packaging container to exit therefrom. As shown in FIG. 1, the valve 5 is arranged within the opening 6 such that the opening edge 6a encircles the valve 5 and such that a surface area of the opening 6 is greater than a surface area of the valve 5. The opening edge 6a of the opening 6 is thus arranged outwardly the outer edge 5a of the valve 5, the opening edge 6a is arranged with a distance of 3-7 mm from the outer edge of the valve 5.

The laminate membrane 1 comprises a tear-away area 18 which is delimited by a contour line 21 arranged in the top member 2. A tear strip 19 is arranged in the top member 2 and forms part of the tear-away area 18. The tear-strip 19 comprises a pull-tab 20 which is arranged at a grip end of the tear strip 19. The pull-tab 20 has no attachments to the bottom member 3 and is separable from the bottom member 3 of the tear membrane 1. The laminate membrane further comprises two embossing lines 4 provided on opposing sides of the opening 6.

Figure 2:
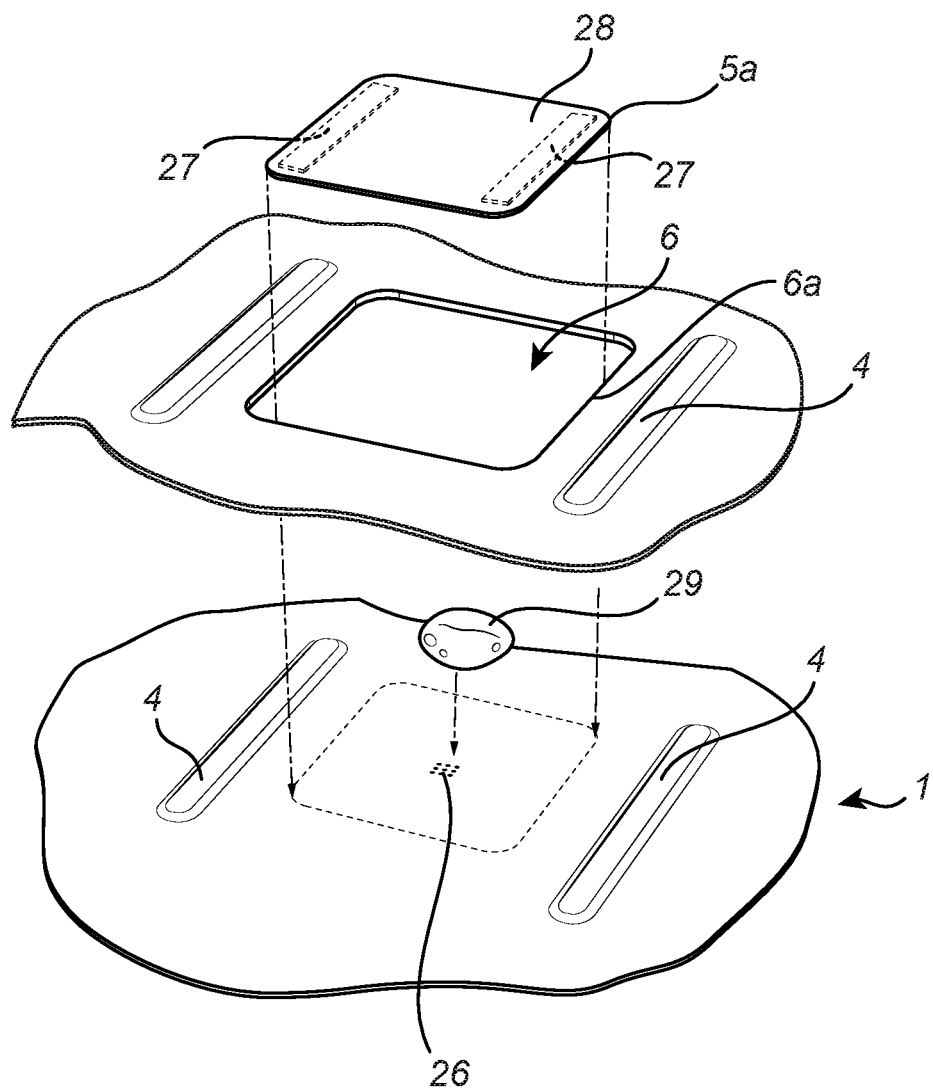

FIG. 2 is an exploded view of a part of the sealing membrane 1 shown in FIG. 1. The bottom member 3 is perforated, here with nine perforations 26, under the valve 5 to allow excess air to exit the inner compartment of the packaging container when the sealing member 1 is applied. However, the bottom member 3 may of course be perforated with, for example, from 1 to 15 perforations, such as from 3 to 12 perforations. As illustrates in this figure, the valve 5 includes an upper barrier layer 28 and two elongated adhesive material strips 27 arranged on a surface of the upper barrier layer 28 intended to face the bottom member 3 and to be arranged on the bottom member 3 on opposing sides of the perforations 26. The adhesive material strips may be for example be adhesive film strips or adhesive applied in elongated strips. The valve 5 further includes a sealing lubricant 29, such as oil, for example silicon oil, applied over the perforations 26 and the upper barrier layer 28 covering the two elongated adhesive strips 27 and the sealing lubricant 29. The valve 5 is a pressure-relief valve allowing gas to exit the inner compartment 11 of the packaging container 10 (shown in FIG. 5) when the pressure inside the packaging container 10 exceeds the target pressure by opening of the pressure-relief valve 5. The arrows shown in the figure indicates the gas passage during exit. The sealing membrane 1 is provided with embossing lines 4 in the top and bottom member 2,3 to attach the top member 2 to the bottom member 3 adjacent the opening 6 to keep the layers together at the opening 6.

Figure 3:
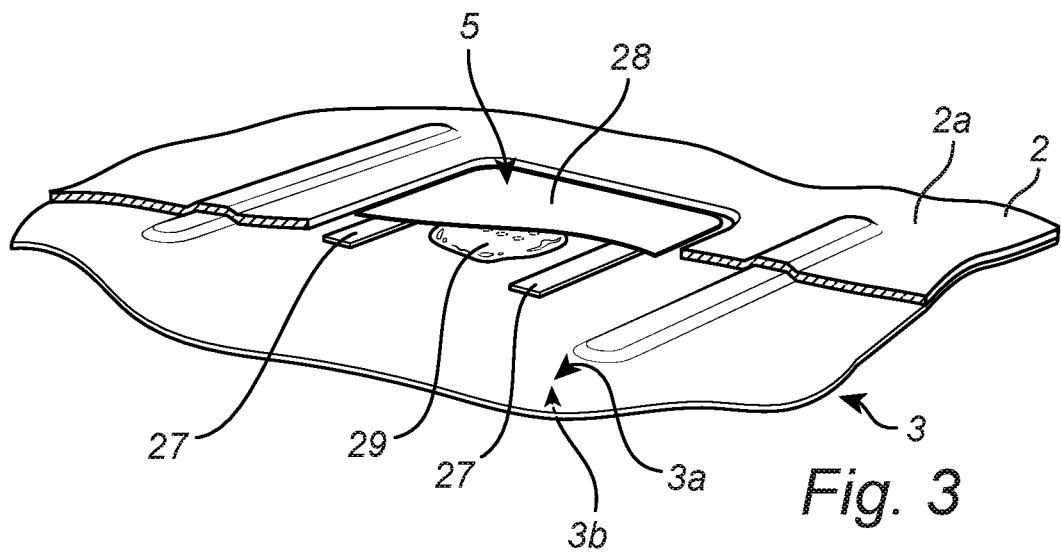
FIG. 3 shows a cutaway view of the laminate membrane according to FIG. 2.

FIG. 3 shows a central part of the sealing membrane 1 from FIG. 2, wherein a part of the barrier layer 28 is not shown for illustrative purposes. The valve 5 includes the barrier layer 28, the elongated adhesive strips 27 and the sealing lubricant 29 covering the perforations 29. The elongated adhesive strips 27 are attached to the first surface 3a of the bottom member 3, which is opposite to the second surface 3b of the bottom member, intended to be facing the inner compartment of a packaging container. The barrier layer 28 is applied over and attached to the adhesive strips 27. The barrier layer 28 may be any type of film layer, such as a polymeric film layer. As seen in FIG. 3, the top member 2 has a greater thickness than the valve 5, such that the first surface 2a of the top member 2 is slightly above the upper surface of the valve 5, as seen in a thickness direction.

Figure 4A:
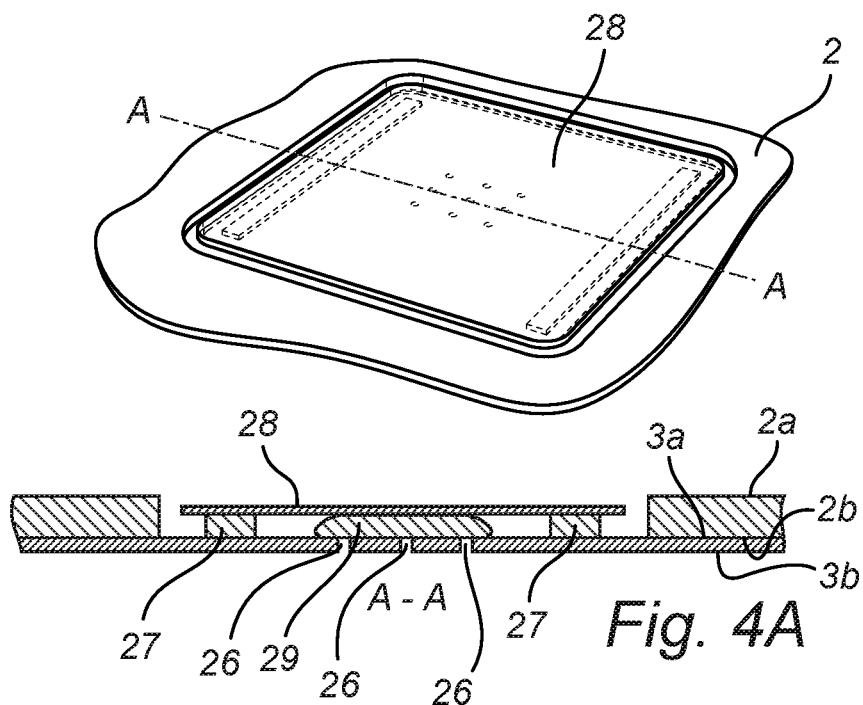
FIG. 4A shows a cross sectional view of a laminate membrane according to the present disclosure, the valve being in a closed configuration.
Figure 4B:
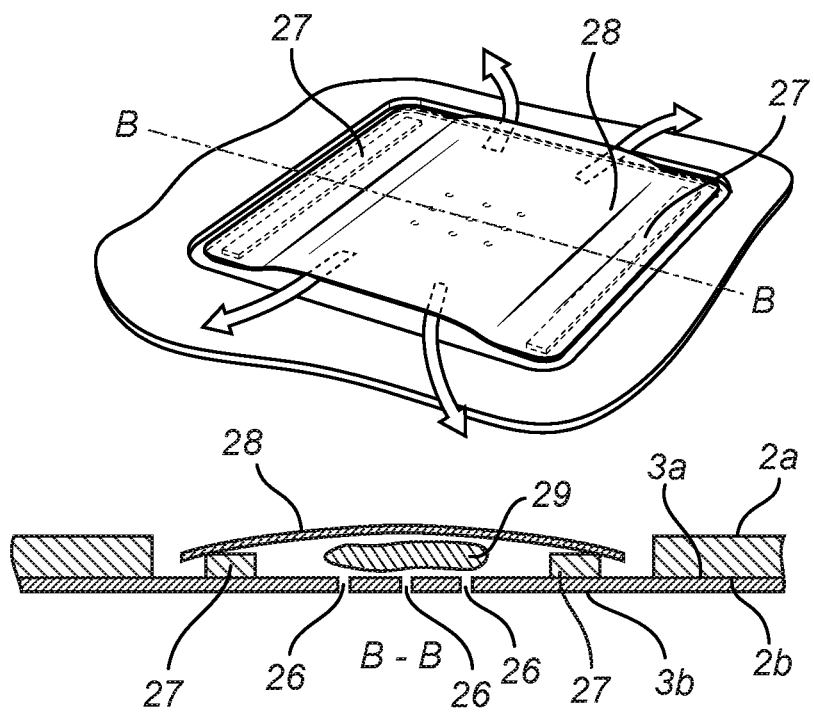
FIG. 4B shows a cross sectional view of a laminate membrane according to the present disclosure, the valve being in an open configuration.

FIGS. 4a and 4b illustrate cross sections of a sealing membrane 1 and the pressure relief valve 5 shown in FIG. 1-3. The cross sectional view shows the top member, with the top member first surface 2a and a top member second surface 2b, and the bottom member with a bottom member first surface 3a and the bottom member second surface 3b. The top member second surface 2b faces the bottom member first surface 3a. FIGS. 4a and 4b illustrate the valve 5 in a closed and an open configuration respectively. FIG. 4a shows the pressure relief valve 5 in the closed configuration. The barrier layer 28 lies against the adhesive strips 27 and is kept in place by the adhesive strips 27. The sealing lubricant 29 is provided over the perforations 26 to ensure that the valve 5 is closed and prevents gas from the inner compartment of the packaging container to escape to the atmosphere. The sealing lubricant 29 also prevents air from entering the inner compartment 11 of the packaging container 10 (shown in FIG. 5) preserving the freshness of the bulk solids inside the packaging container 10.

FIG. 4b illustrates when the pressure in the inner compartment 11 of the packaging container 10 (shown in FIG. 5) exceeds the target pressure required to open the pressure relief valve 5. The sealing lubricant 29 and the barrier layer 28 are pressed upwardly and the barrier layer 28 is flexed outwardly to a convex shape under the force from the target opening pressure from air pressed out through the perforations 26 at a high internal pressure within the packaging container 10. The outwardly flexing of the barrier layer 28 provides channels allowing gas to escape at the open sides of the valve 5 not attached by the adhesive strips 27. The air exits the valve 5 at the valve outer edge 5a at the open sides and between the valve outer edge 5a and the opening edge 6a as indicated by the arrows.

Figure 5:
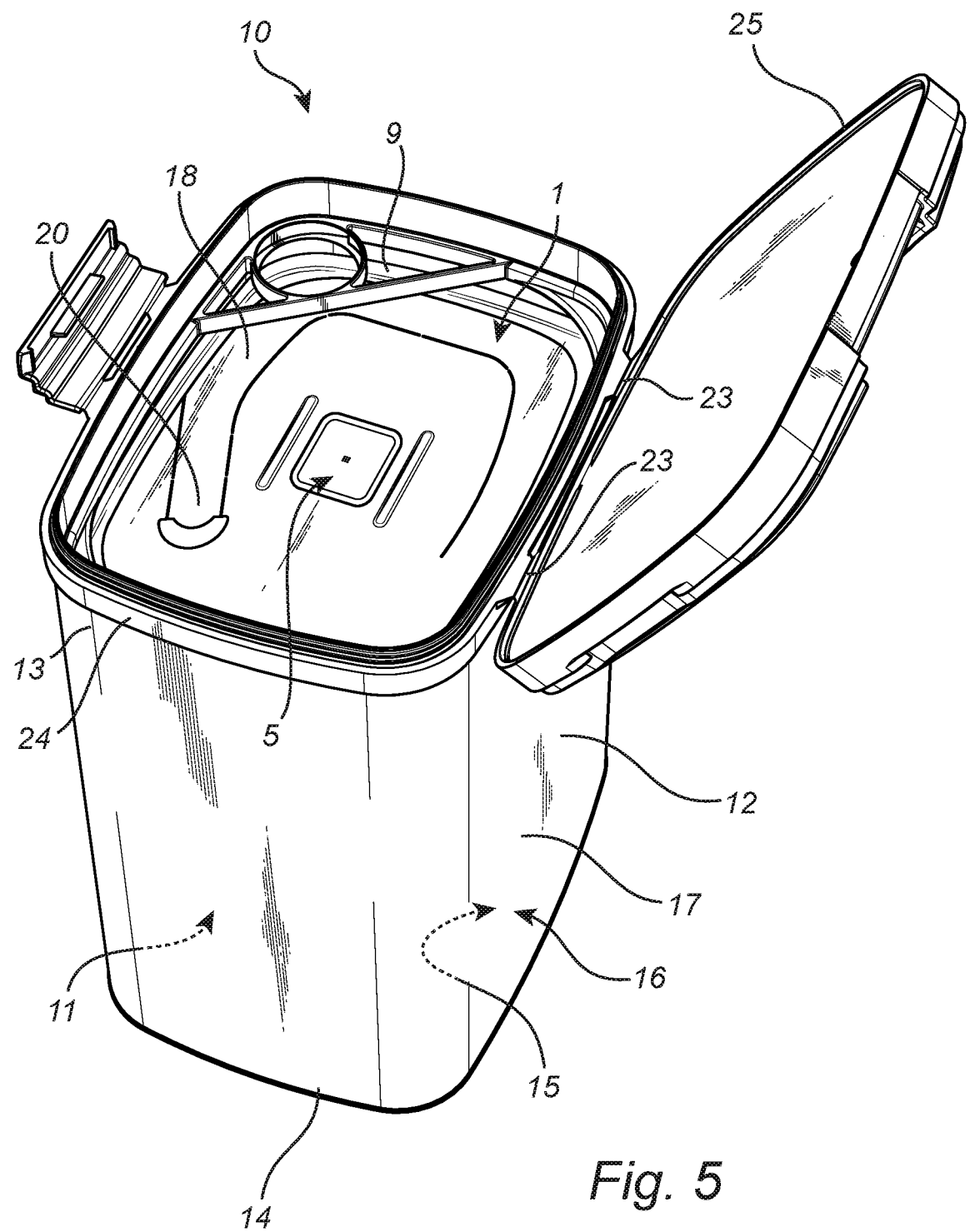
FIG. 5 shows a packaging container according to the present disclosure.

FIG. 5 illustrates a packaging container 10 which is a packaging container for pourable or scoopable bulk solids as defined herein and comprises a tubular container body 12 with a top end 13 having a top opening and a bottom end 14 with a bottom opening comprising a container bottom. The container body comprises a container wall 17 including inner surface 15 facing towards a closed inner compartment 11 in the packaging container 10. The packaging container wall 17 further includes an outer surface 16 facing away from the inner compartment 11. The packaging container 10 is closed at the top opening with the inner laminate membrane 1.

A bottom disc is positioned over the bottom opening of the container body 12. The container body 12 is made from paperboard material as defined herein. The container body 12 may be formed by bringing together the side edges of a web of paperboard causing the material to assume a tubular shape, where after the side edges are sealed together. Sealing of the side edges may be made by any suitable method as known in the art, such as by welding or gluing, with welding being preferred. Sealing of the side edges of the container body web may involve using a sealing strip, as known in the art. The bottom disc may be made from paperboard, metal, plastic, or from any suitable combination of such materials as known in the art. The body may be formed into any desired tubular shape including circular, oval, rectangular and modified rectangular shapes, such as the modified rectangular shape with rounded corners.

The container bottom may alternatively be formed without a bottom disc by folding of the container wall material, as known in the art.

The paperboard packaging container 10 shown in FIG. 5 is provided with a closure arrangement comprising a lid 25 and a reinforcing rim extending along the upper edge of the container wall 17.

The reinforcing rim may be a plastic rim, such as a thermoplastic rim. The reinforcing rim is attached to the inner surface 15 of the container wall 17 at the container opening, preferably by welding.

A weld seal is formed by supplying energy to heat and locally soften or melt one or more thermoplastic components in a thermoplastic rim and/or in a coating or film on the inner surface 15 of the container wall 17 and by pressing the reinforcing rim and the container wall 17 together in a direction perpendicular to the container wall 17.

The lid 25 is connected by a hinge 23 to a frame structure 24, the lid 25 and the frame structure 24 together forming a lid component. The hinge 23 may be a live hinge, formed as a flexible connection between the lid 25 and the frame structure 24. The illustrated hinge 23 is only intended as a non-limiting example and it should be understood that any other type of functional hinge may be used for the connection between the frame structure 24 and the lid 25. Moreover, the lid may be of the removable kind, without any permanent connection to a frame structure, a reinforcing rim or to the container body. It is further to be understood that the closure arrangement as shown in FIG. 5 is non-limiting to the claimed invention and that the laminate membrane as disclosed herein may be used as a transport seal in packaging containers having other types of closure arrangements such as closure arrangements wherein a lid cooperates with a single rim or with an upper edge of the container body to close and open the packaging container. The packaging container may be any type of suitable packaging container such as Cekacan®, Sealio® or Boardio® from A&R Carton.

In the packaging container 10 shown in FIG. 5, the frame structure 24 is mechanically attached to the reinforcing rim by a snap-on connection.

The interior compartment 11 is sealed with a laminate membrane 1 as disclosed herein, e.g. a tear membrane 1 as shown in FIG. 1. The laminate membrane 1 forms a transport seal over packaged goods which are contained in the interior compartment. A membrane welding collar 9 of the laminate membrane 1 is attached to the container wall 17, e.g. by welding. The seal between the membrane welding collar 9 and the container wall 17 is preferably a gas-tight seal or at least a sift-proof seal. The laminate membrane 1 may be attached to the container wall 17 either from the top end 13 of the container body 12 or from the bottom end 14 of the container body 12, in which case it is attached before attaching the bottom disc. In the example shown in FIG. 5, the laminate membrane 1 has been applied from the top end of the container body 12, with the edge portion of the laminate membrane 1 which is attached to the container wall 17 being upwardly directed. The laminate membrane 1 may of course alternatively be attached to the container wall 17 with the edge portion downwardly connected. The membrane welding collar 9 preferably comprises only the top member of the tear membrane 1 but may comprise also the bottom member of the laminate membrane 1 or only the bottom member of the laminate membrane 1.

In order to gain a first access to the packaged goods, a user needs to open the lid 25 and then expose the packaged goods by gripping the pull-tab 20, tearing open the tear membrane 1 along the tear-strip and finally completely removing the tear-away area 18 of the tear membrane 1.

After the tear-away area 18 of the tear membrane 1 has been removed, a narrow edge part of the tear membrane 1 may be left at the inner surface 15 of the container wall 17. Any such remaining part of the tear membrane 1 is preferably as small as possible, in order not to encroach on the opening area. It may be preferred that a remaining tear membrane edge part has a width of at most 7 millimetres such as from 1-6 millimetres, from 2-5 millimetres or from 3-4 millimetres. It may be preferred that the inward extension of a remaining tear membrane part is 4 millimetres or less.

Once the tear membrane 1 has been removed, it is sufficient to open the lid 25 in order to gain access to the packaged goods in the interior compartment through the container top opening.

The invention claimed is:

1. A laminate membrane for sealing an inner compartment in a packaging container, the laminate membrane comprising:
   a top member and a bottom member, the top and bottom members being laminated sheet materials, the top member having a first thickness, a top member first surface and a top member second surface facing said bottom member, the bottom member having a bottom member first surface and a bottom member second surface, wherein the bottom member first surface faces the top member second surface and the bottom member second surface is for being positioned in fluid communication with the inner compartment of the packaging container, wherein the laminate membrane is provided with a valve for allowing gas in the inner compartment of the packaging container to exit therefrom, wherein the valve includes a barrier layer at least partially defining a valve outer edge, the barrier layer arranged covering a sealing lubricant and attached to the bottom member first surface, the top member being provided with an opening having an opening edge, the barrier layer is adhered to the bottom member first surface on opposite sides of the opening, the valve being arranged within the opening such that the opening edge encircles the valve, wherein a surface area of the opening is greater than a surface area of the valve, and wherein said valve has a second thickness less than the first thickness.

2. The laminate membrane according to claim 1, wherein the first thickness of the top member is less than 200 μm.

3. The laminate membrane according to claim 1, wherein the second thickness of the valve is less than 150 μm.

4. The laminate membrane according to claim 1, wherein the valve is a one-way pressure relief valve.

5. The laminate membrane according to claim 1, wherein the first thickness of the top member is a greater thickness than the second thickness of the valve.

6. The laminate membrane according to claim 1, wherein the opening edge is arranged at a distance of 0.5 mm or more from the valve outer edge.

7. The laminate membrane according to claim 1, wherein the opening edge is arranged at a distance of 2 mm or more from the valve outer edge, or wherein the opening edge is arranged at a distance of 3 mm or more from the valve outer edge.

8. The laminate membrane according to claim 1, wherein the opening has a surface area of from 1 $cm^2$ to 6 $cm^2$.

9. The laminate membrane according to claim 1, wherein the top member comprises a laminate sheet material comprising:
 a metallic foil;
 a cardboard layer or a paper layer; and a thermoplastic welding layer,
 wherein the laminate sheet material is joined to the bottom member by welding.

10. The laminate membrane according to claim 1, wherein the bottom member comprises a laminate sheet material comprising:
 a metallic foil or a paper layer; and
 a thermoplastic welding layer,
 wherein the laminate sheet material is joined to the top member by welding.

11. The laminate membrane according to claim 1, wherein the bottom member is perforated in an area covered by the valve.

12. The laminate membrane according to claim 1, wherein the membrane is a tear membrane.

13. The laminate membrane according to claim 1, wherein the top member has a top member peripheral edge and the bottom member has a bottom member peripheral edge, and wherein the top layer peripheral edge extends beyond the bottom layer peripheral edge around a perimeter of the membrane forming a membrane welding collar.

14. A stack of laminate membranes comprising a plurality of laminate membranes, wherein each of the laminate membranes comprises:
 a top member and a bottom member, the top and bottom members being laminated sheet materials, the top member having a first thickness, a top member first surface and a top member second surface facing said bottom member, the bottom member having a bottom member first surface and a bottom member second surface, wherein the bottom member first surface faces the top member second surface and the bottom member second surface is for being positioned in fluid communication with an inner compartment of a packaging container,
 wherein the laminate membrane is provided with a valve for allowing gas in the inner compartment of the packaging container to exit therefrom,
 wherein the valve includes a barrier layer at least partially defining a valve outer edge, the barrier layer arranged covering a sealing lubricant and attached to the bottom member first surface, the top member being provided with an opening having an opening edge, the barrier layer is adhered to the bottom member first surface on opposite sides of the opening, the valve being arranged within the opening such that the opening edge encircles the valve,
 wherein a surface area of the opening is greater than a surface area of the valve, and
 wherein said valve has a second thickness less than the first thickness.

15. A packaging container for bulk solids, said container comprising:
 a tubular container body with a top end with a top opening and a bottom end with a bottom opening comprising a container bottom,
 wherein the container body includes an inner surface facing towards a closed inner compartment in the packaging container and an outer surface facing away from the closed inner compartment,
 wherein the packaging container is closed at the top opening by a removable transport closure, and
 wherein the transport closure is a laminate membrane comprising:
 a top member and a bottom member, the top and bottom members being laminated sheet materials, the top member having a first thickness, a top member first surface and a top member second surface facing said bottom member, the bottom member having a bottom member first surface and a bottom member second surface, wherein the bottom member first surface faces the top member second surface and the bottom member second surface is in fluid communication with the closed inner compartment of the packaging container,
 wherein the laminate membrane is provided with a valve for allowing gas in the inner compartment of the packaging container to exit therefrom,
 wherein the valve includes a barrier layer at least partially defining a valve outer edge, the barrier layer arranged covering a sealing lubricant and attached to the bottom member first surface, the top member being provided with an opening having an opening edge, the barrier layer is adhered to the bottom member first surface on opposite sides of the opening, the valve being arranged within the opening such that the opening edge encircles the valve, wherein a surface area of the opening is greater than a surface area of the valve, and wherein said valve has a second thickness less than the first thickness.

16. A packaging container according to claim 15, wherein the top member has a top member peripheral edge and the bottom member has a bottom member peripheral edge, and wherein the top layer peripheral edge extends beyond the bottom layer peripheral edge around a perimeter of the membrane forming a membrane welding collar, and wherein the membrane welding collar is welded to the inner surface of the container body.

* * * * *